United States Patent [19]

Clar

[11] 4,351,071
[45] Sep. 28, 1982

[54] WATER-SAVING DEVICE

[76] Inventor: Milton Clar, 9408 Linden Ave., Bethesda, Md. 20014

[21] Appl. No.: 230,538

[22] Filed: Feb. 2, 1981

[51] Int. Cl.³ .......................... E03D 1/14; E03D 3/12
[52] U.S. Cl. .......................................... 4/324; 4/381; 4/366; 4/384; 4/415
[58] Field of Search .................... 4/384, 381, 325, 324, 4/326, 327, 378, 405, 415, 249, 366

[56] References Cited

U.S. PATENT DOCUMENTS

| | | | |
|---|---|---|---|
| 449,944 | 4/1891 | McHugh | 4/384 |
| 2,690,567 | 10/1954 | Quebbeman | 4/381 |
| 3,095,577 | 7/1963 | Clark | 4/325 X |
| 3,156,930 | 11/1964 | Moulton et al. | 4/325 |
| 3,538,519 | 11/1970 | Weisz | 4/325 |
| 3,787,902 | 1/1974 | McCombs | 4/325 |
| 4,224,703 | 9/1980 | Makhobey | 4/324 |

*Primary Examiner*—Henry K. Artis
*Attorney, Agent, or Firm*—Shapiro and Shapiro

[57] ABSTRACT

A water-saving device for use in the tank of a flush toilet has a movable latch member for supporting the inlet valve float in an elevated position upon initiation of a flush cycle. A secondary float within the tank controls the latch member and releases the main float to allow opening of the inlet valve only after the tank water level has dropped by a predetermined amount. The delay in opening the inlet valve reduces the amount of water used in the flush cycle.

14 Claims, 2 Drawing Figures

WATER-SAVING DEVICE

BACKGROUND OF THE INVENTION

The invention relates to a water-saving device for use in the tank of a flush toilet, the tank being of the type in which a water inlet valve is controlled by a float.

Flush toilet tanks of the above type generally include a flush valve connected with a manually operable lever or the like, the flush valve controlling communication between the tank and a toilet bowl, so that when the lever is operated to open the valve (the tank being filled with water), a flush cycle is initiated and water is discharged from the tank into the bowl, thereby lowering the water level in the tank.

When the water level in the tank starts dropping, the float is lowered thereby opening the inlet valve so that water also flows into the tank substantially from the start of the flush cycle. Generally, at a predetermined lower water level, the flush valve closes to terminate the flush cycle and the inlet valve remains open to replenish the tank and return the water level to its initial height, where the float closes the inlet valve.

It has been found that the above cycle commonly uses more water than is necessary to effect flushing of the toilet bowl. This is contributed to by the fact that the inlet valve opens substantially at the start of the flush cycle, so that the total quantity of water used exceeds the quantity contained in the tank between the upper water level and the level at which the flush valve closes. The present invention is directed towards saving water during this type of flush cycle.

SUMMARY OF THE INVENTION

It is an object of the invention to provide a device useful for saving water during the flush cycle of a flush toilet.

A more specific object of the invention is to provide a device for saving water during the flush cycle of a flush toilet by delaying opening of the water inlet valve.

Another object of the invention is to provide a device for use in the tank of a flush toilet for preventing the float from dropping when a flush cycle is initiated until a predetermined amount of water has been used.

With the above and other objects in view, the invention provides a device for saving water during the flush cycle of a flush toilet, by holding the inlet valve float of the toilet tank up when a flush cycle is initiated, thereby retaining the inlet valve closed, until a predetermined quantity of water has drained from the tank, and only then allowing the float to drop and open the inlet valve.

The invention contemplates, at least in a preferred form, a releasable latch device to be mounted in the toilet tank in supporting relation to the inlet valve float, so that the latch retains the float in its elevated position when the flush cycle is initiated. Latch control means, which may include a secondary float within the tank, may be provided for moving the latch out of its float-supporting position responsive to a predetermined drop in the tank water level whereby the float is allowed to drop and open the inlet valve, the latch being returned to the float-supporting position when the water level in the tank rises.

The invention is illustrated by way of example in the accompanying drawings.

DESCRIPTION OF PREFERRED EMBODIMENT

Figure 1:
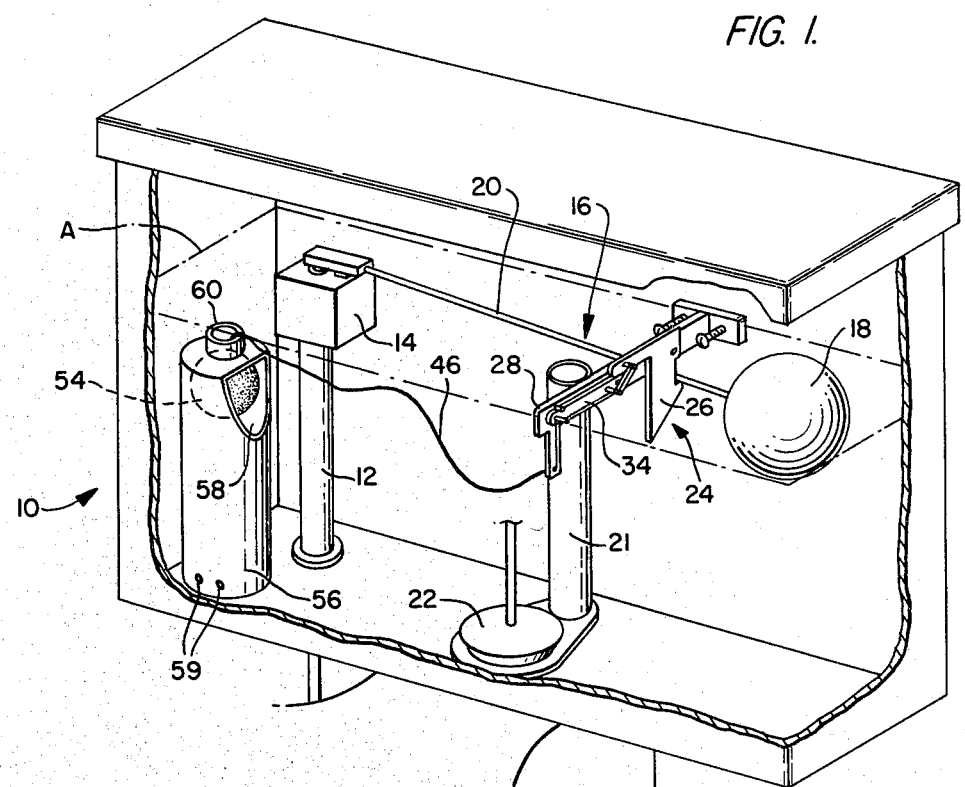
FIG. 1 is a perspective view of a flush toilet tank, with part of the tank wall broken away to show interior tank fittings including a water-saving device in accordance with the invention.

FIG. 1 shows a flush toilet tank 10 having a conventional form of flushing mechanism, only those parts of which are relevant to the present invention being shown and described.

Tank 10 includes a water inlet pipe 12 terminating in an inlet valve assembly 14 controlled by a pivotal float 16 comprising a buoyant ball 18 and a rod 20. Rod 20 is attached to ball 18 and is pivotally mounted atop assembly 14. The rod has, in known manner, a connection with a movable valve element (not shown) of assembly 14 so that when the water level in the tank is at its upper limit A, the float is raised to close the valve and when the float is lowered, the valve is opened to admit water to the tank and restore the water level to its upper limit.

The base of tank 10 has a water outlet (not shown) adjacent an overflow pipe 21, and which outlet communicates with the toilet bowl, to supply flush water from the tank to the bowl. The outlet is obturated by a conventional flush valve 22. Valve 22 is lifted to open the outlet by means of a manual flush lever (not shown) on the outside of the tank.

In conventional operation, with the tank filled to level A, when valve 22 is lifted to initiate a flush cycle, water discharges from the tank into the bowl and due to the falling water level, float 16 drops so that substantially immediately upon initiation of the flush cycle, water is admitted to the tank through the inlet valve. When the water level drops to near the bottom of the tank, the discharge rate being greater than the inlet rate, flush valve 22 is automatically closed to terminate the flush cycle, and the tank is refilled to level A at which point float 16 causes the inlet valve to close.

It will be appreciated that in the conventional flush cycle, since the inlet valve opens substantially immediately upon initiation of the cycle, a greater quantity of water will be consumed than is contained in the tank between level A and the level at which valve 22 closes. To reduce the amount of water used in the flush cycle, a device 24 in accordance with the invention, may be employed in the tank to delay the opening of the water inlet valve after initiation of a flush cycle.

Figure 2:
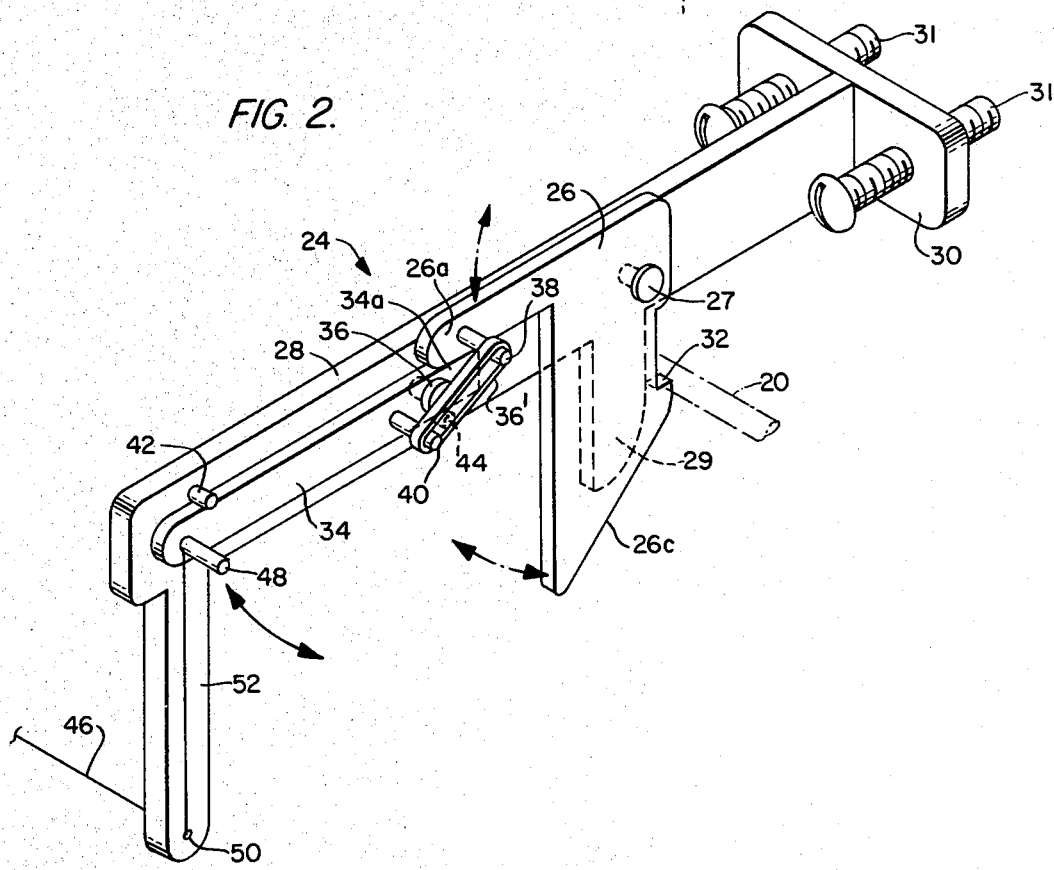
FIG. 2 is a perspective view of parts of the water-saving device.

The inventive water-saving device 24, parts of which are shown in detail in FIG. 2, includes a releasable latch member 26 adapted to engage the rod 20 and support the float in its raised position after the flush valve has been opened, preventing the float from dropping and thereby keeping the inlet valve closed.

Latch member 26 is pivotally mounted by means of a pivot pin 27 on a crossbar 28 in juxtaposition to a leg 29 of the crossbar. At one end, the crossbar has a flange 30 equipped with screws 31. The length of crossbar 28 is such that it may be mounted tightly in the tank between the front and rear walls by adjusting the effective length of the crossbar by means of the screws. The screws, for example, engage the rear wall of the tank and the opposite end of bar 28 engages the front wall of the tank. In use, the crossbar is mounted in a position in which a support shoulder 32 formed on latch member 26 engages under and supports rod 20 in its elevated position.

A latch-actuating member in the form of a link 34 is pivotally attached to crossbar 28 by pin 36, the link having a nose portion 34a engaging an actuating portion 26a of latch member 26, so that when link 34 is swung in a counterclockwise direction about pin 36, nose portion 34a causes the latch member to be swiveled in a clockwise direction about pin 27, thereby releasing rod 20. (Leg 29 acts as an abutment for rod 20 ensuring disengagement from the latch member.) Biasing means in the form of an elastic band 36' mounted between posts 38, 40 on member 26 and link 34, respectively, urges the latch member and link toward the rod-supporting position of these elements shown in the drawings. Lugs 42 and 44 on the crossbar provide stop means for limiting movement of link 34 in opposite directions.

The water-saving device further includes control means for releasing latch member 26 from the rod 20, thereby allowing the float 16 to drop and open the tank inlet valve when the water level in the tank has fallen by a predetermined amount. To this end, a cord 46 is connected to a post 48 on link 34 and is threaded through an opening 50 in an arm 52 dependent from crossbar 28. The free end of cord 46 is attached to a secondary float 54, which may, for example, comprise a tennis ball, contained in a bottle 56 suitably positioned on the base of tank 10. The bottle has a large opening 58 near the top, smaller drain openings 59 near the bottom and a confined neck 60 through which cord 46 is passed.

When the tank is filled to level A, bottle 56 may be totally immersed with float 54 resting against neck 60 and the positioning of bottle 56 being such that there is substantial slack in cord 46. Upon initiation of a flush cycle, the water level in tank 10 drops from level A, but float 16 is held in the elevated position by latch member 26. Conveniently, in this condition, shoulder 32 is substantially directly under pivot pin 27 so that the float does not exert a force on the latch member tending to move it out of the float-engaging position.

When the water level drops below the neck of bottle 56, secondary float 54 is lowered to take up the slack in cord 46. When the slack in cord 46 has been taken up, continued lowering of the water level in bottle 56 causes float 54 to apply tension to the cord so that link 34 is pivoted to move the latch member 26 against the biasing means, out of its float-engaging position and to release the float for downward movement whereby the tank inlet valve is opened.

The length of the cord and the positioning of bottle 56 are preferably such that tension is applied to cord 46 when the water level has dropped to near the bottom of the tank.

At the completion of the flush cycle, when the water rises, cord 46 slackens, allowing band 36' to return the latch member 26 to its float-supporting position. Then, when float 16 rises sufficiently, rod 20 engages an inclined cam surface 26c of the latch member, whereby, with continued upward movement of the float, the rod is snapped back into supporting engagement with shoulder 32.

With suitable arrangement of the above-described parameters determining the level at which the float is allowed to drop following initiation of the flush cycle, it has been found that up to about 1⅛ gallons of water can be saved per cycle. The invention accordingly provides a convenient device for saving water during the toilet flush cycle, which can be readily mounted in existent toilet tanks by means of a simple crossbar-type mounting system adaptable to standard tanks. Alternatively, the device can be supplied as part of the original tank fittings. The crossbar, screws, latch member, link, pivots and posts may conveniently be formed from readily available non-corrosive plastic materials.

While only a preferred embodiment of the invention has been described herein in detail, the invention is not limited thereby and modifications can be made within the scope of the attached claims.

I claim:

1. A water-saving device for use in a flush toilet tank having a water inlet valve controlled by a float, the device comprising a latch member, mounting means for mounting the latch member in the tank in operative relation with the float, for movement between a float-engaging position and a float-disengaging position, the latch member when in the engaging position being adapted to support the float in an inlet valve closing condition in opposition to a flush cycle-initiated drop in the tank water level tending to lower the float, the latch member when in the disengaging position being adapted to release the float for lowering movement in the tank to open the inlet valve, and latch member control means for retaining the latch member in the float-engaging position until the tank water level drops by a predetermined amount and for then moving the latch member to the disengaging position.

2. A device in accordance with claim 1, wherein the control means includes a secondary float adapted to react to the tank water level for moving the latch member from said engaging to said disengaging position when the water level drops by said predetermined amount.

3. A device in accordance with claim 1 or claim 2, wherein the control means includes a latch-actuating member associated with said mounting means for moving the latch member from said engaging to said disengaging position.

4. A device in accordance with claim 3 including biasing means connected between said latch member and said latch-actuating member for urging the latch member toward said engaging position.

5. A device in accordance with claim 1, wherein said latch member is mounted for pivoting movement on said mounting means between said engaging and disengaging positions.

6. A device in accordance with claim 1, wherein said control means includes a latch-actuating member associated with said mounting means, biasing means urging the latch member toward said engaging position, the actuating member being adapted to move the latch member from said engaging position to said disengaging position in opposition to the biasing means when the tank water level drops to a predetermined height and the biasing means being adapted to return the latch member to said engaging position when the water level rises above said predetermined height.

7. A device in accordance with claim 6, wherein said actuating member comprises a pivotal link engaging the latch member, the biasing means being connected between the pivotal link and the latch member.

8. A device in accordance with claim 6, wherein the control means includes a secondary float connected with the actuating member for causing the actuating member to move the latch member from the engaging position to the disengaging position when the tank water level drops to said predetermined height.

9. A device in accordance with claim 8, wherein the secondary float is contained in a bottle having a confined neck.

10. A device in accordance with claim 6, wherein the latch member includes a float-supporting shoulder and a cam surface below said shoulder adapted to cooperate with the float for moving the latch member away from said engaging position responsive to rising movement of the float in the tank, whereby the float is re-engaged with the latch.

11. A device in accordance with claim 8, wherein the secondary float is connected to the actuating member by a cord and causes the actuating member to move the latch member from the engaging position to the disengaging position by producing tension in the chord.

12. A device in accordance with claim 1, wherein said mounting means comprises a crossbar adapted to fit between opposed walls of the tank.

13. A device in accordance with claim 12, wherein the crossbar includes screw adjustment means for varying its effective length.

14. A device in accordance with claim 12, wherein the crossbar includes a transverse flange at one end and screws associted with said flange for adjusting the effective length of the crossbar.

* * * * *